July 14, 1953
P. S. GOODWIN
2,645,750
SLIDEWIRE POWER SUPPLY
Filed Feb. 12, 1951
3 Sheets-Sheet 1
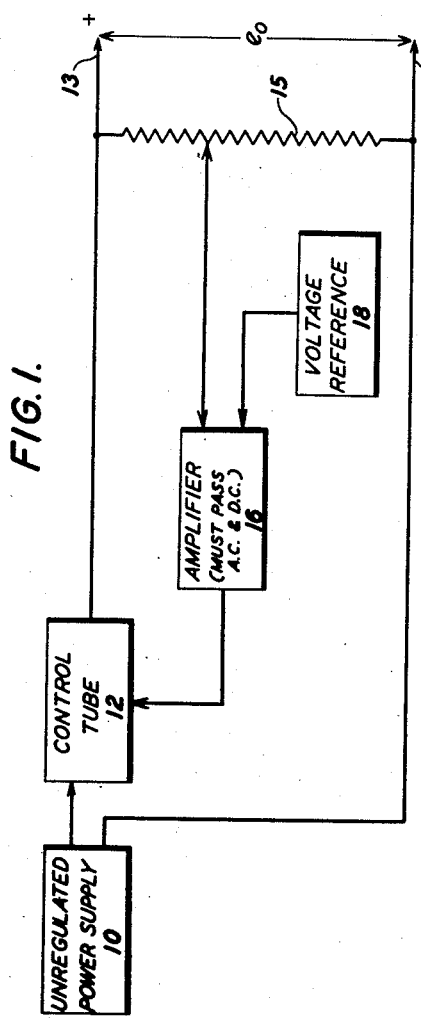
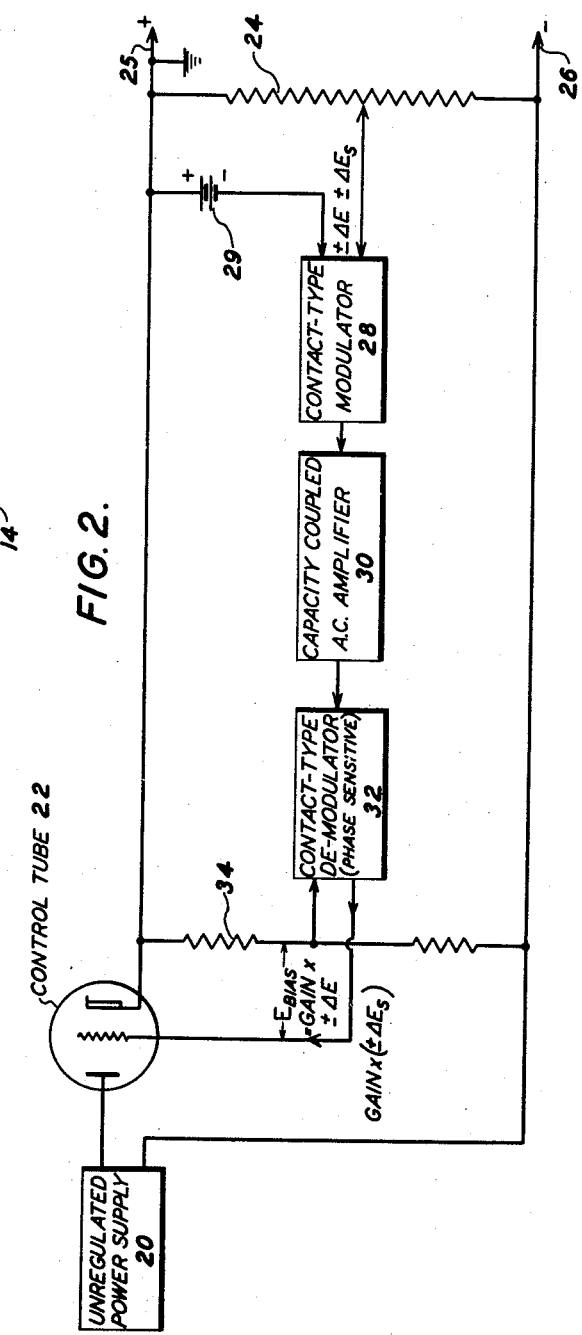
INVENTOR.
PAUL S. GOODWIN
BY
*James B. Christie*
ATTORNEY INVENTOR.
PAUL S. GOODWIN
BY
*James B. Christie*
ATTORNEY

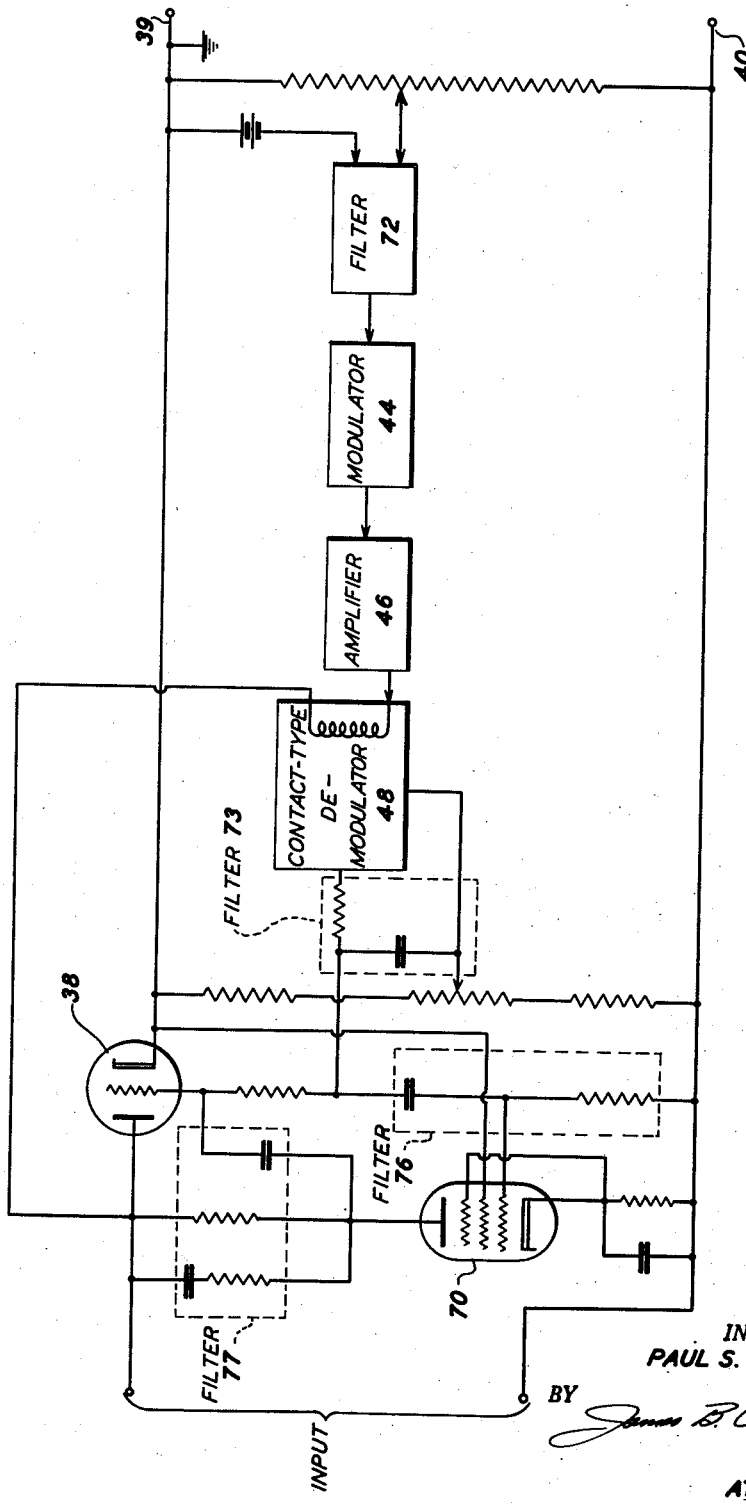

Patented July 14, 1953

2,645,750

UNITED STATES PATENT OFFICE 2,645,750

SLIDEWIRE POWER SUPPLY

Paul S. Goodwin, Pasadena, Calif., assignor to Consolidated Engineering Corporation, Pasadena, Calif., a corporation of California Application February 12, 1951, Serial No. 210,529

10 Claims. (Cl. 323—22)

This invention relates to a voltage regulator circuit characterized by long term stability of approximately .01% in either high or low voltage regulated output. Long term stability as used with reference to this type of an instrument is considered to be about eight hours.

In many applications of electronics research or electronic industrial equipment it is necessary to supply a highly regulated power supply, as for example for filament power to critical filamentary type tubes where regulation and ripple content are critical. Another such application is in the replacement of batteries to power amplifier tubes where amplifier stability is critical. Regulation of small voltages, as for example, 30 volts or below, is extremely difficult particularly where a negative output voltage is sought. The voltage regulator circuit of the present invention is adapted to this use and supplies a voltage as low as 30 volts or less, of either positive or negative polarity and of the above specified stability.

The instant voltage regulator was specifically developed to solve a problem in mass spectrometry, and although in no way limited to this application the invention is conveniently described with relation thereto.

In the analysis of mixtures by inspection of their mass spectra, i. e. mass spectrometry, it is necessary that the spectra of a given sample be both reproducible and constant within itself and yet different from the spectra of other samples. To enable accurate quantitative analysis of the components of a sample, the spectra of the components must not only be qualitatively correct but must appear in the proper magnitude relationship. This latter requirement dictates rigid performance specifications upon many portions of the mass spectrometer. Among the elements of the mass spectrometer subject to such rigid requirements is the amplification system in which the ion discharge signals are amplified and recorded. As an example of an amplification system specifically adapted to such use, reference is had to my co-pending application Serial No. 82,337, filed March 19, 1949.

The instrument described in this co-pending application is essentially a null balancing network in which the tapped-off portion of the total voltage across a slidewire potentiometer is balanced against the input of the amplifier. In the particular instrument described, the voltage across the slidewire may be changed in increments to vary the sensitivity of the recording amplifier and preferably in response to an anticipation signal proportional to the intensity of the succeeding ion beam. The stability of this amplifier is thus dependent upon the stability of the slidewire power supply as well as to other factors not of any significance in this application.

I have found that a battery is unsatisfactory as a source of voltage for the slidewire since the natural voltage drop of the battery when subjected to its rated current drain is sufficient to cause drift in the amplification system in excess of maximum tolerance.

The regulated voltage required for this slidewire supply in the described circumstances is minus 30 volts with a long term stability of 0.1%. To achieve this stability it is essential that the basic power supply design be capable of much greater stability, say of about 0.01%, to allow sufficient margin for production design and testing contingencies. Regulated power supplies of various design have been extensively used in the art. Each of the present known techniques was tried in this particular problem and without success. The failure of the conventional regulators is attributable to the practical limitations of vacuum tubes when operated at the very low potentials here involved and the severity of the imposed stability requirement.

The basic elements of substantially all voltage regulator circuits are an unregulated power supply, a serially connected control tube or voltage dropping tube, a voltage divider network connected across the output leads, an amplifier connected to receive a voltage signal from the voltage divider together with a voltage from a voltage reference and to amplify the algebraic sum of these signals, and to feed this amplified difference to the control tube by means of which the regulated output voltage is determined.

Stability in the region of 0.01% in a 30 volt supply requires that variations in the voltage reference and the input circuit to the regulator amplifier should be less than $3\mu$ volts over the period specified as long term. Such stability in the voltage reference and amplifier input circuits is, of course, to no avail if it is to be obscured in an unstable amplifier. I have now found that to achieve a regulator stability of this order of magnitude the conventional D. C. amplification in existing voltage regulator circuits must be replaced by A. C. amplification, which in turn requires application of a stable modulator to convert the D. C. error signal to an A. C. component compatible to the A. C. amplifier.

In one embodiment the invention contemplates in a voltage regulator circuit including a voltage regulating tube adapted to be connected to an unregulated source of D. C. voltage and a voltage divider connected across the low voltage side of the regulator tube and the negative side of the source, the combination comprising an A. C. amplifier, a contact type modulator connected between the voltage divider and the amplifier input, a reference voltage source connected to said modulator to buck the voltage derived from the voltage divider and a contact type demodulator connected between the output of the amplifier and the grid of the voltage regulator tube to feed to the voltage regulator tube a D. C. type signal proportional to the amplified A. C. error signal.

The use of an A. C. amplifier in accordance with the invention accomplishes two important features. The amplifier does not contribute any drift and hence has no effect on the stability of the regulator. Moreover, the amplifier may be powered from an auxiliary unregulated B+ supply and thereby have sufficient voltage upon the tubes to operate in a normal manner. Since the stages of amplification do not have to be staircased across the available B+ supply with an A. C. amplifier, many more amplifying stages can be employed for the same supply voltage. For this reason a very high gain amplifier can be achieved, which is one of the requirements for high stability in the regulator.

Another feature of the circuit of the invention is that the voltage reference is used under no-load conditions and hence a battery or standard cell used for this purpose will maintain its true potential for very long periods of time. Because of this feature a very stable reference is thereby achieved.

The invention will be more clearly understood from the following detailed description thereof taken in conjunction with the accompanying drawings in which:

Fig. 1 is a schematic diagram of a conventional or basic voltage regulator circuit;

Fig. 2 is a similar schematic diagram of the improved circuit of the invention illustrating the basic differences between this circuit and the conventional circuit of Fig. 1;

Fig. 4 is a detailed wiring diagram showing an alternative embodiment of the circuit of Fig. 3.

Figure 3:
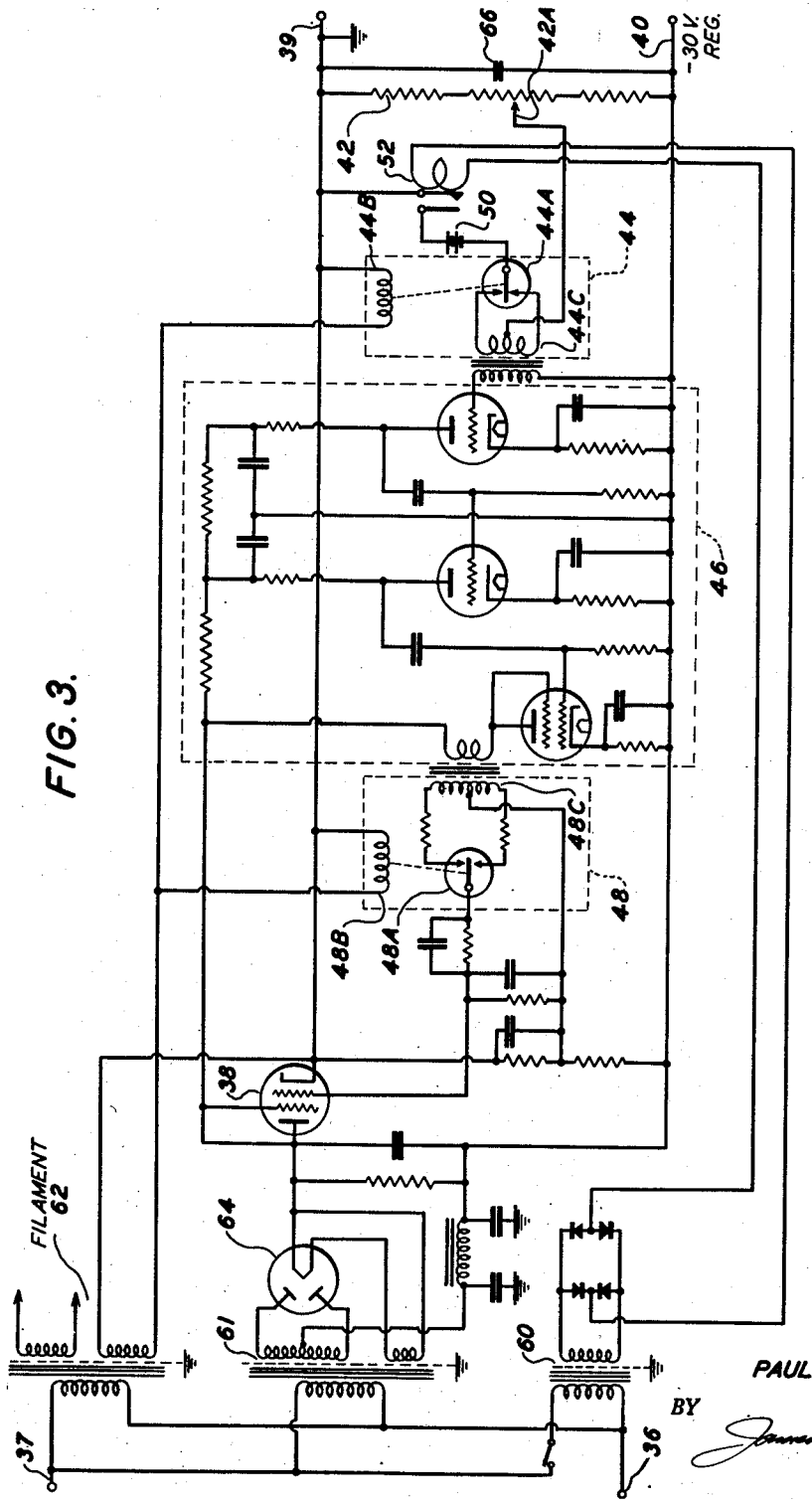
Fig. 3 is a detailed wiring diagram of one form of the circuit of the invention.

Referring to Fig. 1, substantially all voltage regulator circuits, including the circuit of the present invention, fall into a pattern illustrated by this figure. The circuit there shown includes an unregulated power supply 10, a voltage control tube 12 connected serially in the positive output lead of the power supply 10, the regulated voltage appearing across the positive and negative leads 13, 14, respectively. A voltage divider 15 is connected across the output leads 13, 14 and is tapped to apply a voltage to an amplifier 16, this voltage being a predetermined fraction of the regulated output voltage. A voltage reference 18 is connected to the amplifier and is balanced against the tapped voltage so that the error signal, i. e. the algebraic sum of the reference voltage and the signal voltage, is amplified and a proportionate signal is fed to the grid of control tube 12 to regulate the voltage drop across the control tube.

In the conventional regulator circuits, the amplifier 16 is a D. C. amplifier and to achieve the necessary gain must include several staircased stages. Such amplification is suitable only for high regulated output voltages and may be adapted to regulation of low output voltages only by the use of "bucking" batteries connected between the amplification stages. Such batteries, however, are bulky, unreliable and expensive and a voltage regulator circuit employing D. C. amplification and requiring bucking batteries to permit a low output voltage is not a reasonable solution to the problem.

Fig. 2 shows the system of the present invention schematically and, like the basic circuit shown in Fig. 1, includes the unregulated power supply 20, a voltage control or voltage dropping tube 22, a voltage divider 24 connected across positive and negative output leads 25, 26, respectively. To this extent the circuit of Fig. 2 is identical with that of Fig. 1. In this instance, and unlike the circuit illustrated in Fig. 1, the voltage signal tapped off of divider 24 is fed to a contact type modulator 28 together with a voltage from a voltage reference 29, in this instance a battery. The contact type modulator 28 is a chopper-transformer combination of conventional construction. The stability of the modulator is $2\mu$ volts, obviously better than the required stability of the instrument. For convenience the carrier frequency, as determined by the rate of chopping of the contact type modulator, is selected as 60 C. P. S. line frequency.

The output of the modulator 28 is fed to a capacity coupled A. C. amplifier 30. Since the chopping rate of the modulator 28 is 60 C. P. S., this means that the amplifier 30 is actually amplifying a 60 cycle carrier and its associated side bands, the signal received by the amplifier being a 60 cycle signal of the magnitude determined by the algebraic sum of the reference voltage supplied from source 29 and the error signal tapped from the voltage divider 24. The phase of the 60 cycle signal in the amplifier is determined by the chopper.

The series dropping tube 22 between the unregulated output must be supplied with a D. C. signal at its grid. The output of the A. C. amplifier 30 is therefore demodulated in a phase-sensitive, contact type demodulator 32 to convert it back to D. C. The demodulator 32 is synchronized with the modulator 28 at a 60 C. P. S. rate. Thus any signal picked up and amplified in the amplifier 30 of a frequency other than 60 C. P. S. or out-of-phase 60 C. P. S. stray signal will not be of proper frequency or phase to pass through the demodulator, and hence will not appear at the grid of the regulator tube. For this reason low frequency tube characteristic changes or high frequency noise will not appear in the output, and hence the amplifier is stable with respect to these effects.

A divider 34 is connected between the output leads 25, 26 and to the demodulator 32 to establish static bias on the grid of the dropping tube 22. This bias voltage is quiescent on the control tube to establish the desired stable output condition. The operating point of the tube would otherwise be determined by a voltage designated as plus or minus $\Delta E$, which is equal to the bias voltage divided by the gain of the amplifier and is again of quiescent voltage value. The regulation is determined by a voltage designated as plus or minus $\Delta E_s$ which represents the changes in the output caused by unwarranted phenomenon and the changes to be regulated out by action of the regulator. These various voltage signals are indicated symbolically on the drawing of Fig. 2 to further clarify the significance of the circuit.

Referring to Fig. 3, the circuit of Fig. 2 is shown in greater detail including an unregulated source (line voltage) connected across terminals 36, 37, a control tube or voltage dropping tube 38, positive and negative output leads designated respectively as 39, 40, a voltage divider 42 connected across the output leads, a contact type modulator 44, an A. C. amplifier 46 and a contact type demodulator 48. Because the circuit for use in the particular circumstances mentioned above requires a negative output voltage, the positive output lead 39 is grounded. However, this is not a limiting feature of the invention.

The contact type modulator includes a chopper 44A driven by a coil 44B and connected through a transformer 44C to the input of the amplifier 46. A voltage reference source 50, in this instance a battery, is connected through a relay 52 to the positive buss 39 at its positive side and to the contact arm of the chopper 44A through its negative side. Tap 42A of the voltage divider is connected to the midpoint of the primary of transformer 44C so that the A. C. signal applied across the transformer from the chopper 44A is bucked by the voltage derived from the divider 42. The resultant signal applied to the grid of the first stage amplification in amplifier 46 is a modulated signal of a frequency determined by the driving frequency of the chopper 44A and the amplitude of which is proportional to the algebraic sum of the voltage derived from the divider 42 and the reference voltage source 50.

The demodulator 48 likewise includes a chopper 48A, a drive coil 48B, and an input transformer 48C. The drive coils 44B, 48B of the modulator and demodulator, respectively, are connected to the same source of A. C. power, and are thus synchronized so that the output signal from the modulator 48 is a replica of the input signal to the demodulator times the gain of the amplifier 46. The output of amplifier 46 is a negative voltage which applies both bias and error signal to the control grid of the dropping tube 38. The network including several capacitors and resistors connected between the contact arm of the chopper 48A and the control grid of the tube 38 comprises a conventional filter.

In the particular circuit shown in Fig. 3, the unregulated line voltage is applied across three transformers 60, 61, 62. The transformer 60 is connected to operate the relay 52 controlling the voltage reference 50. The transformer 61 is connected through a rectifier 64 to the plate of the dropping tube 38, and the transformer 62 is connected to power the chopper driving coils 44B and 48B and to supply voltage to the filaments of the amplifier tube.

The D. C. stability of the regulator is established at the required level by insuring a sufficiently high gain in the amplifier 46 and also that the stability of the input circuit in absolute values is at least as good, if not better, than the required stability of the output. In addition to the D. C. stability of the regulator, it becomes important to consider its A. C. stability in view of the carrier frequency fed through the amplifier 46. The band width of this amplifier (input to output) is from zero frequency (D. C.) to about 10% of the carrier frequency, which is six cycles per second. It is necessary to reduce or eliminate 60 cycle ripple output from the regulator, as the above described mass spectrometer amplification system is also a carrier system at this frequency and any ripple in the regulator output would very likely add spurious signals to the amplification system.

Ripple reduction can be achieved in two ways in accordance with the invention, one of which is exemplified in Fig. 3 and another in Fig. 4. In the circuit of Fig. 3 the ripple is removed by the expedient of a capacitor 66 connected across the output busses 39, 40.

An alternative means of accomplishing this function is illustrated in Fig. 4, which shows an alternative embodiment of the circuit of Fig. 3 with corresponding parts being similarly identified. In the circuit of Fig. 4 an auxiliary A. C. amplifier 70 is connected in parallel with the regulating amplifier 46. The function of the auxiliary amplifier 70 is to increase the effective gain of the amplifying portion of the regulator in the region above 6 C. P. S. and below some arbitrary upper limit, say 6,000 C. P. S. The increase in gain in this region causes 60 and 120 C. P. S. ripple to be suppressed in the output by direct regulator action.

When two such amplifiers are used in parallel, it is necessary to adjust their overlapping frequency characteristics so as to minimize the phase shift at the crossover point, which in this instance is somewhere between 6 and 60 C. P. S. Unless the phase shift is so limited, oscillation or very poor regulation will occur at the crossover frequency. In the circuit of Fig. 4 the crossover networks of both amplifiers comprise R-C filters in the input and output circuit of the respective amplifiers. Thus amplifier 46 is provided with input and output filters 72, 73, respectively, and amplifier 70 is provided with input and output filters 76, 77, respectively. The illustrated arrangement represents a conventional crossover network and may be replaced by any of a large number of known networks of this type.

The invention has been described herein with particular reference to its application as a regulated power supply for slide-wire potentiometers in recording and anticipator amplifiers of a mass spectrometer. The regulator circuit, however, has many potential uses other than that specifically described. The disclosed design is the only known design for producing a regulated power of such low rated value output and particularly a negative output voltage, and will therefore have widespread application, some of which applications have been mentioned in the preliminary portions of this specification. Although the major importance of the described regulator is in the low voltage region of regulated supplies, it is equally adapted to regulating higher voltages and will be indicated for such use where high stability is important.

I claim:

1. In a voltage regulator circuit including a voltage regulating tube adapted to be connected serially to an unregulated source of D. C. voltage and a voltage divider connected across the low voltage side of the regulator tube and the negative side of the unregulated source, the combination comprising an A. C. amplifier, a contact type modulator connected between said voltage divider and the amplifier input, a reference voltage source connected to said modulator to buck the voltage tapped from said voltage divider, and a contact type demodulator connected between the output of said amplifier and the grid of said voltage regulator tube.

2. In a voltage regulator circuit including a voltage regulating tube adapted to be connected serially to an unregulated source of D. C. voltage and a voltage divider connected across the low voltage side of the regulator tube and the negative side of the unregulated source, the combination comprising an A. C. amplifier, a contact type modulator connected between said voltage divider and the amplifier input, a reference voltage source connected to said modulator to buck the voltage tapped from said voltage divider, a contact type demodulator connected between the output of said amplifier and the grid of said voltage regulator tube, and means driving the modulator and demodulator synchronously.

3. In a voltage regulator circuit including a voltage regulating tube adapted to be connected serially to an unregulated source of D. C. voltage and a voltage divider connected across the low voltage side of the regulator tube and the negative side of the unregulated source, the combination comprising an A. C. amplifier, a contact type modulator connected between said voltage divider and the amplifier input, a reference voltage source connected to said modulator to buck the voltage tapped from said voltage divider, a phase-sensitive contact type demodulator connected between the output of said amplifier and the grid of said voltage regulator tube, and means driving the modulator and demodulator synchronously.

4. In a voltage regulator circuit including a voltage regulating tube adapted to be connected serially to an unregulated source of D. C. voltage and a voltage divider connected across the low voltage side of the regulator tube and the negative side of the unregulated source, the combination comprising an A. C. amplifier, a contact type modulator connected between said voltage divider and the amplifier input, a reference voltage source connected to said modulator to buck the voltage tapped from said voltage divider, a phase-sensitive contact type demodulator connected between the output of said amplifier and the grid of said voltage regulator tube, and means for removing undesired A. C. components from the regulated output.

5. A voltage regulator circuit according to claim 4 wherein said means for removing undesired A. C. components from the regulated output comprises a capacitor connected across the output.

6. In a voltage regulator circuit including a voltage regulating tube adapted to be connected serially to an unregulated source of D. C. voltage and a voltage divider connected across the low voltage side of the regulator tube and the negative side of the unregulated source, the combination comprising a first A. C. amplifier, a contact type modulator connected between said voltage divider and the input to said first amplifier, a reference voltage source connected to said modulator to buck the voltage tapped from said voltage divider, a phase-sensitive contact type demodulator connected between the output of said first amplifier and the grid of said voltage regulator tube, and a second A. C. amplifier connected in parallel with the first amplifier and having a frequency response higher than that of the first amplifier.

7. In a voltage regulator circuit including a voltage regulating tube adapted to be connected serially to an unregulated source of D. C. voltage and a voltage divider connected across the low voltage side of the regulator tube and the negative side of the unregulated source, the combination comprising a first A. C. amplifier, a contact type modulator connected between said voltage divider and the input of said first amplifier, a reference voltage source connected to said modulator to buck the voltage tapped from said voltage divider, a phase-sensitive contact type demodulator connected between the output of said first amplifier and the grid of said voltage regulator tube, a second A. C. amplifier connected in parallel with the first amplifier and having a frequency response higher than that of the first amplifier, and means for adjusting the overlapping frequency characteristics of the two amplifiers.

8. A voltage regulator circuit according to claim 7 wherein said means for adjusting the overlapping frequency characteristics of the two amplifiers comprises a separate crossover network associated with each amplifier.

9. A voltage regulator circuit according to claim 8 wherein each of said separate crossover networks comprises a separate R-C filter connected in the input and output of the respective amplifiers.

10. In a voltage regulator circuit including a voltage regulating tube adapted to be connected serially to an unregulated source of D. C. voltage and a voltage divider connected across the low voltage side of the regulator tube and the negative side of the unregulated source, the combination comprising an A. C. amplifier, a contact type modulator connected between said voltage divider and the amplifier input, a reference voltage source connected to said modulator to buck the voltage tapped from said voltage divider, the connection of the reference source and the voltage divider to said modulator being such that no load is placed on said reference source, and a phase-sensitive contact type demodulator connected between the output of said amplifier and the grid of said voltage regulator tube.

PAUL S. GOODWIN.

References Cited in the file of this patent

UNITED STATES PATENTS

| Number | Name | Date |
| --- | --- | --- |
| 2,436,720 | Jones | Feb. 24, 1948 |
| 2,442,300 | Liston | May 25, 1948 |

OTHER REFERENCES

Review of Scientific Instruments, vol. 19, No. 4, April 1948, "An Inductively Coupled Series Tube D. C. High Voltage Regulator."